(12) United States Patent
Hall et al.

(10) Patent No.: US 6,480,043 B2
(45) Date of Patent: Nov. 12, 2002

(54) CIRCUIT AND METHOD FOR PROTECTING A SWITCHING POWER SUPPLY FROM A FAULT CONDITION

(75) Inventors: Jefferson W. Hall, Phoenix; Jade H. Alberkrack, Tempe, both of AZ (US)

(73) Assignee: Semiconductor Components Industries LLC, Phoenix, AZ (US)

( * ) Notice: Subject to any disclaimer, the term of this patent is extended or adjusted under 35 U.S.C. 154(b) by 0 days.

(21) Appl. No.: 09/317,348

(22) Filed: May 24, 1999

(65) Prior Publication Data

US 2001/0043091 A1 Nov. 22, 2001

(51) Int. Cl.$^7$ ................................................. H03K 3/00
(52) U.S. Cl. ........................ 327/108; 327/540; 323/276
(58) Field of Search ........................ 327/108–112, 538, 327/540, 541; 323/265, 276

(56) References Cited

U.S. PATENT DOCUMENTS

| 4,233,558 A | * | 11/1980 | Gaertner ..................... 323/17 |
|---|---|---|---|
| 4,825,144 A | | 4/1989 | Alberkrack et al. ......... 323/272 |
| 4,965,502 A | * | 10/1990 | Ogasawara ................. 318/628 |
| 5,335,162 A | * | 8/1994 | Martin-Lopez .............. 363/97 |
| 5,815,043 A | * | 9/1998 | Chow et al. .................. 331/57 |
| 6,137,702 A | * | 10/2000 | Hall et al. .................... 363/95 |
| 6,337,788 B1 | * | 1/2002 | Balakrishnan et al. ........ 361/86 |

* cited by examiner

Primary Examiner—Kenneth B. Wells

(57) ABSTRACT

A switching regulator (18) for use in a switching power supply (10) detects a fault condition by looking for asserted feedback signal during a timer period. If feedback is asserted during the timer period, then the switching power supply (10) is operating normally. If feedback is not asserted during the timer period, then the switching power supply is in a fault condition. One way of implementing the timer is to charge and discharge by-pass capacitor (23). The timer period is the time for the $V_{CC}$ voltage to drop from a maximum value to a predetermined threshold. A counter (102) can also be used as the timer. When a fault is detected, the gate drive signal from the switching regulator is disabled for a period of time before attempting auto-restart.

36 Claims, 2 Drawing Sheets

CIRCUIT AND METHOD FOR PROTECTING A SWITCHING POWER SUPPLY FROM A FAULT CONDITION

BACKGROUND OF THE INVENTION

The present invention relates in general to power supply regulation and, more particularly, to a switching regulator with fault protection.

Most if not all electronic devices require a DC voltage of appropriate level for proper operation. The DC voltage is derived from an AC power source, e.g. by plugging a power supply into a wall socket. The AC voltage available at the wall socket is converted to a DC bulk voltage by a full-wave rectifier diode bridge. The DC bulk voltage is further converted to a regulated DC output voltage by a switching power supply.

The switching power supply uses a transformer, or an inductor depending on the configuration, as an energy transfer element. For example, a flyback-type power supply has a power transistor coupled to one side of the primary winding of a transformer. The power transistor turns on and off as determined by a switching regulator circuit to alternately store energy in the magnetic field of the transformer and transfer the stored energy to the secondary winding. The secondary winding of the transformer develops a rectified output voltage across a shunt capacitor coupled across the secondary winding as a function of the energy transfer. The voltage across the capacitor provides the DC output voltage of the switching power supply.

The DC output voltage increases and decreases inversely with the applied load. An increasing load decreases the DC output voltage and a decreasing load increases the DC output voltage. The DC output voltage, or a representation thereof, is fed back to the switching regulator circuit to allow the switching power supply to compensate for load variation. As the load increases, the DC output voltage decreases which causes the switching regulator to leave the power transistor on for a longer average period of time in order to store more energy in the magnetic field. The additional energy is transferred to the secondary winding during the off time of the power transistor to supply the increased load and re-establish the DC output voltage. As the load decreases, the DC output voltage increases which causes the switching regulator to leave the power transistor on for a shorter average period of time to store less energy in the magnetic field. The reduced energy transfer to the secondary winding during the off time of the power transistor causes the power supply to adjust to the decreased load and reduces the DC output voltage back to its steady-state value.

A typical prior art switching regulator circuit generates a pulse width modulated control signal, or a fixed frequency, fixed duty cycle control signal which is enabled or disabled for one or more cycles in response to the feedback signal. The switching regulator generates a drive signal from the control signal to turn the power transistor on and off in order to regulate the DC output voltage across the output terminals of the switching power supply.

Many switching regulators cannot detect an overload or fault condition. A fault condition occurs when the output load exceeds the maximum rating of the power converter. A fault includes a short-circuit across the output terminals of the power supply. In a fault condition, the DC output voltage drops below its average value under nominal loading. Prior art switching regulators generally interpret a drop in the DC output voltage as an indication to supply more power to the output and bring the DC output voltage back up to its nominal value. However, supplying more power into a fault, overload, or short circuit is a safety hazard and can damage the switching power supply and/or the load itself.

Another problem experienced by prior art switching power supplies involves loss of feedback. One common feedback scheme uses an opto-isolator to monitor the DC output voltage and provide feedback information to the switching regulator. The switching regulator tends to push the DC output voltage to a maximum value absent any feedback. The feedback information operates to inhibit or disable the switching regulator as necessary to maintain the DC output voltage at a regulation threshold. If the phototransistor in the opto-isolator should fail or the feedback signal is otherwise lost, then the switching power supply would continuously deliver maximum power to load. The loss of feedback information is another fault condition that can damage the power supply and/or the load.

Hence, a need exists for a switching regulator circuit which can detect a fault condition and reduce the energy transfer to the load.

DETAILED DESCRIPTION OF THE PREFERRED EMBODIMENT

Figure 1:
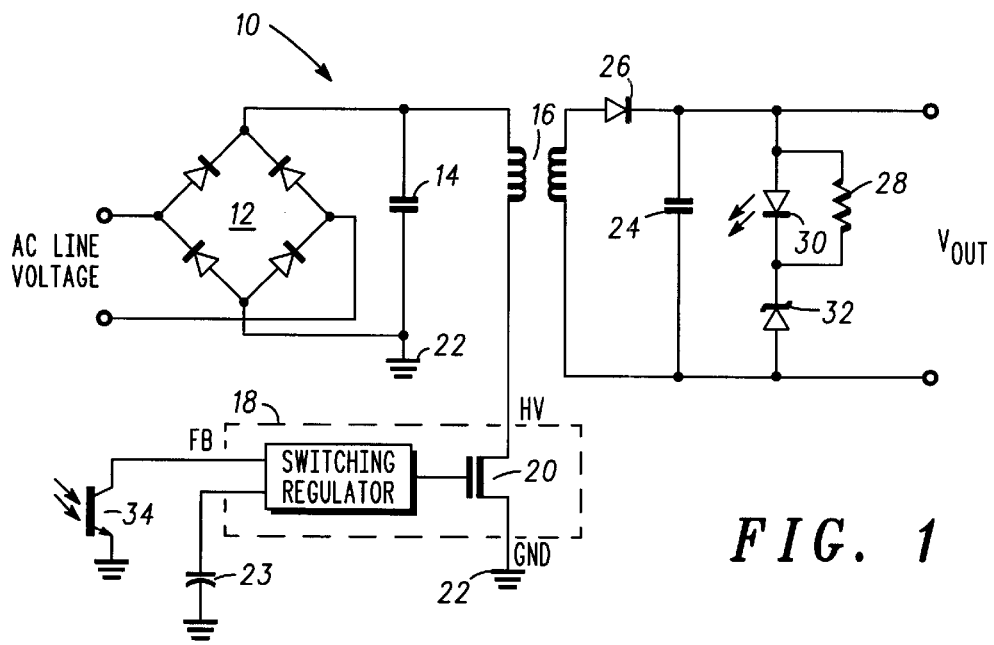
FIG. 1 illustrates a switching power supply using secondary side regulation.

Referring to FIG. 1, a switching power supply 10 is shown receiving an AC line voltage. The AC line voltage is converted to a DC bulk voltage by full-wave rectifier diode bridge 12. Capacitor 14 filters the DC bulk voltage. The primary winding of transformer 16 receives the DC bulk voltage. Regulator circuit 18 is implemented as an integrated circuit (IC) using conventional high voltage IC manufacturing processes. The IC package has at least three pins, one of which is a feedback (FB) pin connected as the feedback input to the switching regulator. A second high voltage (HV) pin is connected to the drain of power switching transistor 20 for coupling to a high voltage on the primary winding of transformer 16. Power transistor 20 conducts an inductor current through the primary winding of transformer 16. A third ground (GND) pin is coupled to power supply conductor 22 operating at circuit ground potential. An optional fourth pin (VCC) of the IC package is coupled to capacitor 23 for providing a positive power supply to the IC. Capacitor 23 can be coupled to the VCC pin external to the IC, or capacitor 23 can be internally coupled to a terminal of the IC.

Power transistor 20 operates on regulation cycles controlled by switching regulator 18. When power transistor 20 conducts in a flyback configuration, an inductor current flows through the primary winding and stores energy in the magnetic field of transformer 16. When power transistor 20 is non-conductive, the energy stored in the magnetic field is transferred to the secondary winding. Capacitor 24 is coupled with diode 26 across the secondary winding of transformer 16 to develop a DC output voltage $V_{OUT}$. Diode 26 prevents current flow back into the secondary winding.

A current flows through resistor 28 and zener diode 32 under nominal operating conditions. Optical light-emitting diode (LED) 30 and photo-detection transistor 34 operate as an optical isolator to electrically isolate and optically couple the feedback information from capacitor 24 to the FB pin of switching regulator IC 18. If LED 30 is forward biased, then a current flowing through LED 30 generates a quantity of photons proportional to the current flow. The photons are received by the photo-detection base of transistor 34 to render it conductive. Transistor 34 attempts to conduct current from its collector to its emitter. However, since switching regulator 18 is only able to source limited current from its FB pin into the collector of transistor 34, transistor 34 saturates and the collector of transistor 34 is pulled to a low voltage. If LED 30 is not forward biased, then no photons are emitted from LED 30 leaving transistor 34 non-conductive and its collector is high impedance.

The DC output voltage $V_{OUT}$ operates either above or below a predetermined regulation threshold in response to changes in output loading. The regulation threshold is set by the voltage across zener diode 32 plus the voltage across LED 30 when forward biased. As the output load increases or consumes energy from capacitor 24 the DC output voltage $V_{OUT}$ falls below the regulation threshold. The voltage across resistor 28 is such that LED 30 is not forward biased. Transistor 34 is non-conductive and the collector of transistor 34 is high impedance (feedback not asserted). With feedback not asserted, switching regulator 18 switches power transistor 20 on and off to transfer energy to the DC output.

As the load decreases, the DC output voltage $V_{OUT}$ increases above the regulation threshold and causes LED 30 to become forward biased. A current flows through LED 30 and generates a quantity of photons proportional to the current flow. The photons transferred to the base of transistor 34 are sufficient to render it conductive and pull its collector to a low voltage (feedback asserted). With feedback asserted, switching regulator 18 disables switching of power transistor 20 so that no energy transfers to the DC output.

The low voltage or high impedance on the collector of transistor 34, in response to the DC output voltage $V_{OUT}$ operating above or below the regulation threshold, represents feedback information that is provided to the FB pin of switching regulator IC 18. Switching regulator 18 provides a gate drive signal to the gate of power transistor 20 in response to the feedback signal to turn it on and off as necessary to regulate the DC output voltage $V_{OUT}$.

The regulation scheme shown in FIG. 1 is commonly called secondary side regulation because the feedback information is generated on the secondary side of the transformer. In the present embodiment, the feedback information is either asserted (low voltage) or not asserted (high impedance) depending on whether the DC output voltage $V_{OUT}$ is above or below the regulation threshold. Switching regulator 18 is configured to continue pushing the DC output voltage $V_{OUT}$ to a higher value when the feedback signal is not asserted. When the DC output voltage $V_{OUT}$ is greater than the regulation threshold and the feedback signal is asserted, then the feedback loop provides a low voltage to the FB pin which causes switching regulator 18 to disable the gate drive signal for one or more regulation cycles. Disabling the gate drive signal prevents power transistor 20 from conducting during a particular regulation cycle. Holding power transistor 20 off during one or more regulation cycles stores no additional energy in the magnetic field of the transformer. Consequently, no additional energy is transferred to the secondary winding and the DC output voltage $V_{OUT}$ is held at the regulation threshold.

The present invention is also applicable to other feedback schemes including primary side sensing where another auxiliary winding (not shown) is used to generate the feedback signal.

Figure 2:
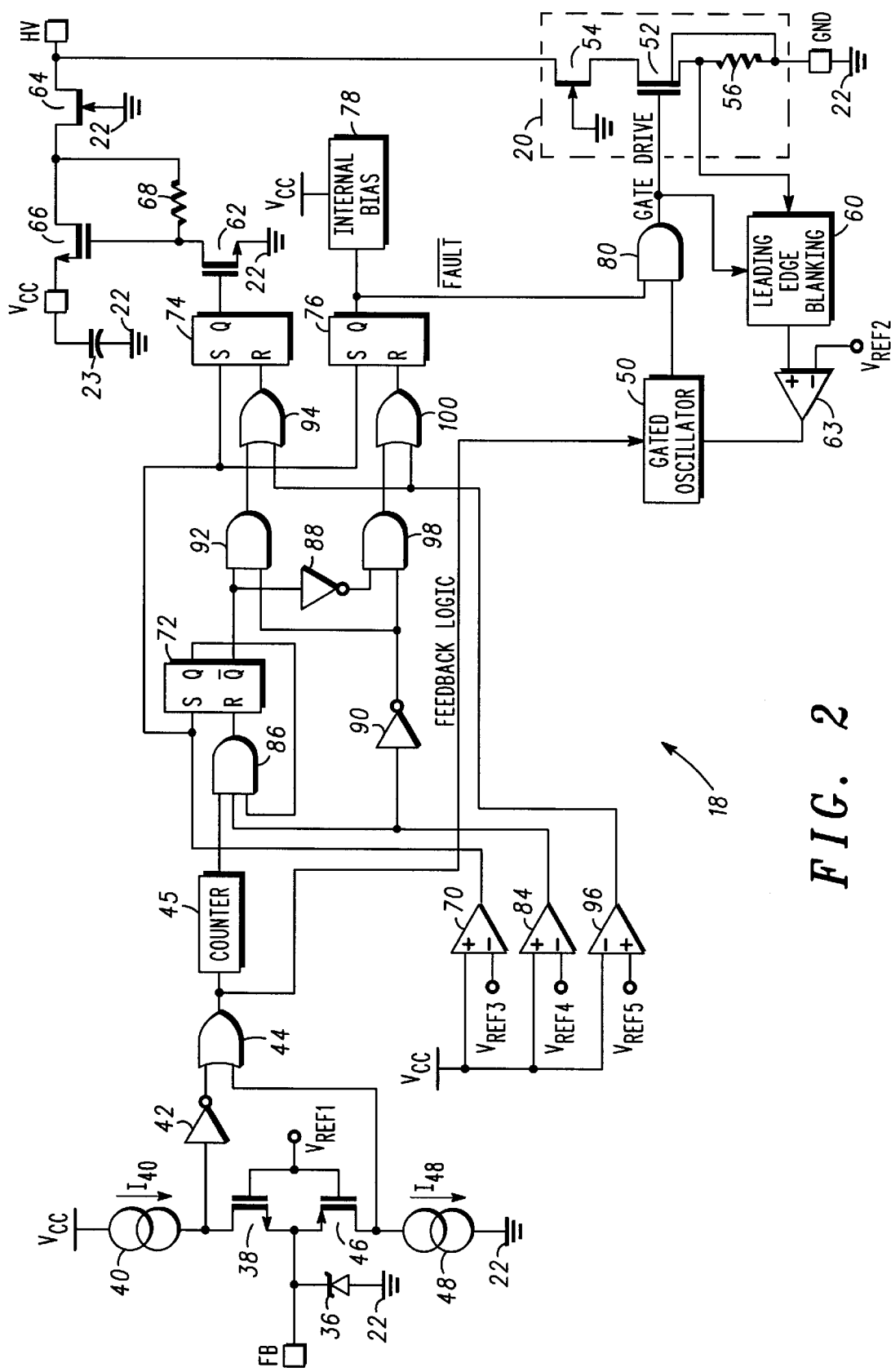
FIG. 2 illustrates the switching regulator of FIG. 1.

Turning to FIG. 2, switching regulator 18 is shown with further detail. The feedback signal is received on the FB pin. Zener diode 36 is coupled to the FB pin to provide electrostatic discharge (ESD) protection. Transistor 38 receives the reference voltage $V_{REF1}$ set to 3.5 volts at its gate. When the feedback signal is asserted as a low level (DC output voltage above regulation threshold), transistor 38 turns on and conducts current $I_{40}$ from current source 40. The input of inverter 42 goes to logic zero and the output of inverter 42 at the first input of OR gate 44 is logic one. Transistor 46 also receives the reference voltage $V_{REF1}$ at its gate. With the feedback signal low, transistor 46 is off and current source 48 sinks current $I_{48}$ pulling the second input of OR gate 44 to logic zero. When the feedback signal is high impedance (feedback not asserted), transistor 38 turns off. Current source 40 sources current $I_{40}$ into the input of inverter 42 causing its output to go to logic zero. With the feedback signal not asserted, transistor 46 is off and current source 48 sinks current $I_{48}$ pulling the second input of OR gate 44 to logic zero.

Switching regulator 18 also operates in a feedback configuration where the feedback signal is asserted as a high level and non-asserted as a high impedance. If the feedback signal is asserted as a high level, transistor 46 turns on and conducts current $I_{48}$ into current source 48. The second input of OR gate 44 goes to logic one. With the feedback signal high, transistor 38 is off and current source 40 sources current $I_{40}$ into inverter 42. The first input of OR gate 44 is logic zero. When the feedback signal is high impedance (feedback not asserted), transistor 46 turns off. Current source 48 sinks current $I_{48}$ from the second input of OR gate 44 causing that node to go to logic zero. With the feedback signal not asserted, transistor 38 is again off and current source 40 sources current $I_{40}$ into inverter 42 setting the first input of OR gate 44 to logic zero. In both feedback configurations, if the feedback signal is asserted, the output of OR gate 44 (FEEDBACK LOGIC) is logic one. If the feedback signal is not asserted, then the FEEDBACK LOGIC signal is logic zero. Switching regulator 18 includes an optional counter 45 to count occurrences of the output of OR gate 44 going to logic one. When counter 45 is used, the FEEDBACK LOGIC signal is taken at the counter input.

Gated oscillator 50 generates a gate drive signal in response to the FEEDBACK LOGIC signal. The gate drive signal is disabled when FEEDBACK LOGIC is logic one and switches at 100 KHz when FEEDBACK LOGIC is logic zero. Power transistor 20 as shown in FIG. 1 is a simplified representation of what in reality is two separate devices, i.e. a low voltage MOSFET 52 and a high voltage JFET 54. The gate drive signal controls MOSFET 52 to conduct the inductor current from the HV pin. JFET 54 provides high voltage isolation from the HV pin for the low voltage MOSFET 52.

JFET 54 has a drain coupled to the HV pin to conduct inductor current from the primary side of transformer 16 through MOSFET 52. A first source of MOSFET 52 is coupled to the GND pin to conduct the majority of the inductor current. A second source of MOSFET 52 is coupled through resistor 56 to the GND pin. The voltage across resistor 56 is a current sense signal indicative of the current through MOSFET 52 that is fed back to leading edge blanking (LEB) circuit 60. Further detail of LEB circuit 60 is disclosed in U.S. Pat. No. 5,418,410 which is hereby incorporated by reference. Briefly, LEB circuit 60 inhibits feeding back the current sense signal during a portion of the rising edge of the gate drive signal to MOSFET 52. LEB circuit 60 monitors the gate drive signal and passes the current sense signal when the rising edge of the gate drive signal exceeds a Miller plateau voltage as determined by the characteristics of MOSFET 52 and the applied DC bulk voltage. The current sense signal is compared to reference voltage $V_{REF2}$ set to 0.5 volts. When the current sense signal exceeds $V_{REF2}$, the output of comparator 63 switches to logic one indicating peak current limit. Peak current limit causes gated oscillator 50 to disable the gate drive signal and turn off MOSFET 52 for the present regulation cycle.

The present invention is also applicable to other switching regulators including pulse width modulators which operate on a fixed frequency and vary the pulse width according to the feedback signal.

Figure 3:
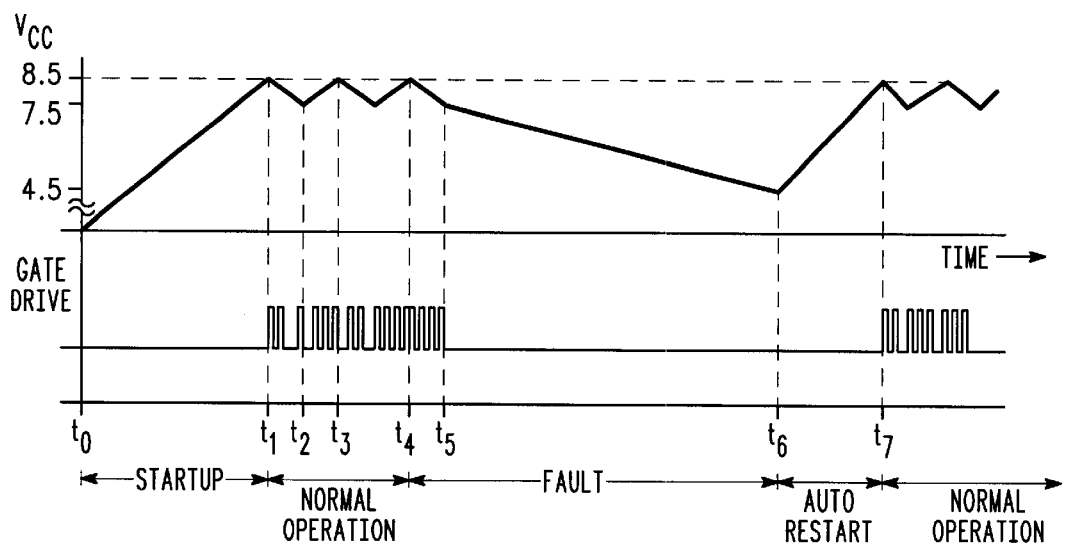
FIG. 3 illustrates a waveform plot useful in the explanation of FIG. 2.

Turning to FIG. 3, a waveform plot is shown of startup, normal operation, and fault conditions. At time to, switching regulator 18 is powered-down. Transistor 62 is initially non-conductive. The DC bulk voltage is applied to the HV pin. JFET 64 is a high voltage device that provides high voltage isolation by separating the HV pin from the low voltage MOSFET 66. MOSFET 66 is biased into conduction by resistor 68. MOSFET 66 conducts a start-up current into capacitor 23 which charges the $V_{CC}$ voltage as shown in FIG. 3.

At time $t_1$, the $V_{CC}$ voltage exceeds the reference voltage $V_{REF3}$ set to 8.5 volts. The output of comparator 70 changes to logic one and sets RS latch 72. Latch 72 is a set dominate latch. The Q-output of latch 72 goes to logic one and its $\overline{Q}$-output goes to logic zero. The logic one from comparator 70 also sets the Q-output of RS latch 74 and RS latch 76 to logic one. Latch 74 is a set dominate latch and latch 76 is a reset dominate latch. The Q-output of latch 76 is the $\overline{FAULT}$ signal that enables internal bias circuit 78 to supply nominal bias voltages and currents to switching regulator 18. The $\overline{FAULT}$ signal from the Q-output of latch 76 is also applied to one input of AND gate 80. AND gate 80 operates as a gate driver to pass or block the gate drive signal from gated oscillator 50 to MOSFET 52 in response to the $\overline{FAULT}$ signal. When $\overline{FAULT}$ is logic one, internal bias circuit 78 and AND gate driver 80 are enabled. When $\overline{FAULT}$ is logic zero, internal bias circuit 78 is reduced to low power mode and gate driver 80 is disabled. The Q-output of latch 74 turns on transistor 62 which turns off MOSFET 66. The start-up current is shut off and the $V_{CC}$ voltage begins to fall as capacitor 23 is supplying power to operate switching regulator 18.

A feature of the present invention is to detect an overload or fault condition and disable the gate drive signal. It is unsafe and potentially damaging for switching regulator 18 to switch continuously and transfer energy to the DC output of switching power supply 10 during a fault condition. During normal operation, switching regulator 18 receives an asserted feedback signal at regular intervals. This is a normal consequence of regulating the DC output voltage. If switching power supply 10 is not in a fault condition, then at some point sufficient energy is transferred to the DC output that the DC output voltage rises above the regulation threshold and enables LED 30 to turn on transistor 34 and assert the feedback signal. If switching regulator 18 never receives an asserted feedback signal while continuing to switch the gate drive signal for an extended period of time, then switching power supply 10 is determined to be in a fault condition.

The fault is detected by switching regulator 18 setting a timer. If no feedback signal is asserted by the end of the timer period, then switching power supply 10 is determined to be in a fault condition. Once a fault is detected, switching regulator 18 disables the gate drive signal for a period of time and then enters an auto-restart mode to determine if the fault has been removed and to return to normal operation. If the fault is no longer present, then auto-restart results in switching regulator 18 resuming normal operation. If the fault is still present, then switching regulator 18 again detects the fault and disables the gate drive signal for another period of time. Switching regulator 18 continues the process of auto-restart and fault detection until the fault is removed and normal operation may resume.

In FIG. 2, the timer function is provided by charging the $V_{CC}$ voltage on capacitor 23 to 8.5 volts and then allowing it to discharge to 7.5 volts. The time period to discharge capacitor 23 based on average power consumption of switching regulator 18 is about 100 milliseconds for a capacitor 23 value of 20 microfarads. The timer period is programmable and set by the value of capacitor 23 and the value of the reference voltages to the comparators. The timer period should be longer than the time required for capacitor 24 to reach nominal operating voltage during start-up.

The timer sequence during normal operation proceeds as follows. Starting at time $t_1$, MOSFET 66 has charged the $V_{CC}$ voltage on capacitor 23 to 8.5 volts. After time $t_1$, the $V_{CC}$ voltage begins to fall as shown in FIG. 3 as switching regulator 18 consumes power from capacitor 23. The Q-output of latch 72 is logic one. The reference voltage $V_{REF4}$ is set to 7.5 volts. The $V_{CC}$ voltage is greater than the reference voltage $V_{REF4}$ so the output of comparator 84 is logic one. AND gate 86 receives the logic one from the Q-output of latch 72 and the logic one from comparator 84.

Switching regulator 18 includes at least two options for monitoring the feedback signal. In a first option, the output of OR gate 44 is coupled to one input of AND gate 86. If the FEEDBACK LOGIC signal goes to logic one, indicating feedback asserted, anytime before the $V_{CC}$ voltage falls to 7.5 volts at time $t_2$, then the output of AND gate 86 goes to logic one and resets latch 72. The combination of AND gate 86 and latch 72 operates as a detector to detect an asserted feedback signal, i.e. a logic one FEEDBACK LOGIC signal.

In another option, the output of OR gate 44 is coupled to the clock input of counter 45. Counter 45 is preset to a count value to count up or count down in response to the logic one signals from OR gate 44. For example, counter 45 may be initially set to a value of two and programmed to count down. The counter value represents the number of feedback signals (one or more) that must be asserted before switching regulator 18 acknowledges that feedback has been asserted during the timer period. When counter 45 reaches a count of zero, its output changes state to logic one and sets the output of AND gate 86 to logic one to reset latch 72. Counter 45 provides noise immunity by requiring a number of asserted feedback signals, i.e. a number of logic one FEEDBACK LOGIC signals, within the timer period before detecting normal operation.

When latch 72 is reset in response to one or more asserted feedback signals within the timer period, the $\overline{Q}$-output of latch 72 goes to logic one. The output of inverter 88 goes to logic zero. As the $V_{CC}$ voltage falls below 7.5 volts, the output of comparator 84 switches to logic zero and the output of inverter 90 goes to logic one. The output of AND gate 92 goes to logic one and the output of OR gate 94 goes to logic one. The logic one from OR gate 94 resets latch 74 and turns off transistor 62. MOSFET 66 turns on and sources current to charge capacitor 23. The $V_{CC}$ voltage rises back up to 8.5 volts at time $t_3$ and the timer cycle repeats.

Comparator 96 compares the $V_{CC}$ voltage with the reference voltage $V_{REF5}$ set to 4.5 volts. Since the $V_{CC}$ voltage does not drop below 7.5 volts during normal operation the output of comparator 96 remains at logic zero. AND gate 98 receives a logic zero from inverter 90 before the $V_{CC}$ voltage drops to 7.5 volts and/or a logic zero from inverter 88 after the output of counter 45 goes to logic one. During normal operation, the output of AND gate 98 is logic zero, the output of OR gate 100 is logic zero, and latch 76 is not reset. The $\overline{FAULT}$ signal remains at logic one. Internal bias circuit 78 remains operating and AND gate 80 continues to pass the gate drive signal to MOSFET 52.

The timer period is defined from the peak $V_{CC}$ voltage of 8.5 volts to the time comparator 84 changes state, i.e. $V_{CC}$=7.5 volts. During each timer period, switching regulator 18 must receive one or more asserted feedback signals to reset latch 72 for normal operation to continue. An asserted feedback signal as seen in FIG. 3 corresponds to the time when the gate drive signal is disabled in a low state. It is reasonable in normal operation, i.e. no fault condition, that switching regulator 18 always receives one or more asserted feedback signals sometime during the timer period.

Assume a fault condition occurs at time $t_4$ as shown in FIG. 3. No feedback signal is asserted between time $t_4$ and time $t_5$ because the DC output is faulted or because no feedback information is delivered because of an opto-isolator fault. Switching regulator 18 continues to switch MOSFET 52 between times $t_4$ and $t_5$ in an attempt to get the DC output voltage back to its regulation value. However, the fault condition prevents the DC output voltage from rising to its regulation threshold or otherwise inhibits any asserted feedback signals. Transferring energy in a faulted condition is not safe and may result in damage to switching power supply 10 or its load.

At time $t_4$, latches 72, 74, and 76 are set as described above. By time $t_5$, latch 72 has not been reset by a logic one output of counter 45. The $\overline{Q}$-output of latch 72 is logic zero, the output of AND gate 92 is logic zero, and the output of inverter 88 is logic one. Latch 74 is not reset to turn off transistor 62. MOSFET 66 does not turn on to re-charge capacitor 23. The $V_{CC}$ voltage continues to fall past time $t_5$. When the output of comparator 84 switches to logic zero, the output of inverter 90 goes to logic one and the output of AND gate 98 goes to logic one. The output of OR gate 100 goes to logic one and resets latch 76. The $\overline{FAULT}$ signal goes to logic zero to disable internal bias circuit 78 or set it to a low power mode, and further disable AND gate 80 from passing any gate drive signals to MOSFET 52. AND gate 80 blocks the gate drive signal when the $\overline{FAULT}$ signal is logic zero. The $V_{CC}$ voltage falls at a slower rate with internal bias circuit 78 switched to a low power mode. Notice there are no gate drive signals from time $t_5$ to time $t_7$ in FIG. 3. Switching regulator 18 has detected switching power supply 10 to be in a fault condition because no feedback signal is received in the timer period. Switching regulator 18 enters a shutdown mode to discontinue transferring energy to the DC output.

The $V_{CC}$ voltage continues to decline until it falls below the reference voltage $V_{REF5}$ at time $t_6$. At that point, switching regulator 18 enters an auto restart mode. Comparator 96 switches to logic one and the output of OR gate 94 goes to logic one to reset latch 74. The output of OR gate 100 is logic one. Transistor 62 turns off to release the gate of MOSFET 66. MOSFET 66 conducts a charging current to capacitor 23 to bring the $V_{CC}$ voltage back up to 8.5 volts. When the $V_{CC}$ voltage reaches 8.5 volts, the output of comparator 70 goes to logic one to set latches 72, 74, and 76. Internal bias circuit 78 and AND gate 80 are enabled. Switching regulator 18 proceeds with normal operation.

If the fault condition is still present, then no feedback signal is asserted in the next timer period starting at time $t_7$. In that case, switching regulator 18 enters shutdown mode again at the end of the timer period as described above.

The embodiment shown in FIG. 2 uses the discharge rate of the $V_{CC}$ voltage on capacitor 23 as a timer. This embodiment offers a number of advantages. There is low average power output during a fault because switching is disabled. Operating internal bias circuit 78 in a low power mode during a fault condition extends the off time to achieve even lower average output power and further reduces power consumption. Sweeping the $V_{CC}$ voltage from 7.5 to 8.5 volts can be used to spread the switching frequency spectrum over a wider range and reduce electromagnetic interference (EMI) and the need for costly EMI filtering circuitry. The timer is programmable by selecting the value and the effective the charge and discharge rate of capacitor 23 and by selection of the reference voltages to the comparators. The switching regulator provides protection for soft faults (loading beyond maximum load), hard faults (short circuit), and feedback faults. The present invention does not require an auxiliary winding in the switching power supply for powering the switching regulator. The switching regulator operates over a wide range of DC bulk voltages.

In some applications, it may be desirable not to auto-restart. Once a fault is detected and the switching regulator is shutdown, the user would need to take affirmative action to restart the switching power supply. For example, the user may press a restart button or the user may need to completely remove AC line input voltage from the switching power supply before normal operation can resume.

The timer can be implemented in a variety of ways. For example, the timer may be implemented as a counter that counts up or counts down at a known frequency. One output of the counter, corresponding to the output of comparator 70 in the $V_{CC}$ capacitor timer implementation, generates a logic one at the beginning of the count sequence to set latches 72, 74, and 76 to start the timer period. At a later count value, a second output of the counter, corresponding to the output of comparator 84 in the $V_{CC}$ capacitor timer implementation, goes to logic one to end the timer period. If latch 72 has detected an asserted feedback signal during the timer period, then switching regulator 18 continues normal operation. If latch 72 is not reset in the timer period, then switching regulator 18 shuts down and waits a period of time before attempting auto-restart. At an even later count value, a third output of the counter, corresponding to the output of comparator 96 in the $V_{CC}$ capacitor timer implementation, goes to logic one to initiate auto-restart.

Figure 4:
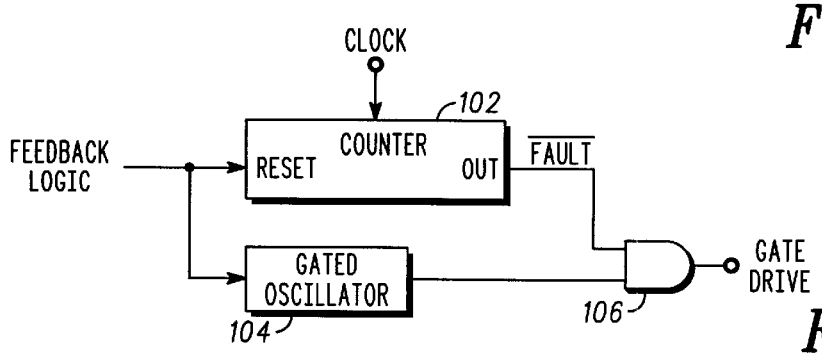
FIG. 4 illustrates a switching regulator using a counter as a timer.

In another embodiment, the timer period is reset each time one or more feedback signals are asserted. FIG. 4 illustrates a counter 102 having a reset input coupled for receiving the FEEDBACK LOGIC signal as generated from OR gate 44 in FIG. 2. The FEEDBACK LOGIC signal also controls gated oscillator 104 to generate the gate drive signal as shown in FIG. 2. The output of counter 45 goes to logic one after receiving one or more feedback signals on the FB pin. A logic one counter 45 output signal resets counter 102 to an initial value. Counter 102 counts up or counts down from the initial value. The switching regulator continues normal operation so long as counter 102 is reset to its initial value by a logic one signal from counter 45 before its counts to its detection value. If counter 102 counts to the detection value before being reset, then the switching power supply is determined to be in a fault condition. Upon detecting the fault, counter 102 generates a logic zero $\overline{FAULT}$ signal to AND gate 106 to block the gate drive signal. The switching regulator shuts down and waits a period of time before attempting auto-restart.

Resetting the timer period each time one or more feedback signals are asserted also works when the $V_{CC}$ voltage is used to generate the timer period. In that case, the timer period is determined by the time for the $V_{CC}$ voltage to drop from a peak value to a detection threshold. The timer period is reset by re-charging the $V_{CC}$ voltage to the peak value each time the FEEDBACK LOGIC goes to logic one. As long as the $V_{CC}$ voltage remains above a detection threshold, then the switching power supply is in normal operation. If the feedback signal is not asserted one or more times before the timer period expires, i.e. by the time the $V_{CC}$ voltage falls below the detection threshold, then the switching power supply is determined to be in a fault condition. The switching regulator shuts down and waits a period of time before attempting auto-restart.

In summary, the present invention provides a switching regulator for use in a switching power supply. The switching regulator detects a fault condition by looking for an asserted feedback signal during a timer period. If feedback is asserted during the timer period, then the switching power supply is operating normally. If feedback is not asserted during the timer period, then the switching power supply is in a fault condition. One way of implementing the timer is to charge and discharge a by-pass capacitor. The timer period is the time for the $V_{CC}$ voltage to drop from a maximum value to a predetermined threshold. A counter can also be used to generate the timer period. When a fault is detected, the gate drive signal from the switching regulator is disabled for a period of time before attempting auto-restart, thereby reducing the average power delivered to the load.

What is claimed is:

1. A switching regulator operating from a supply voltage for generating a drive signal in response to a feedback signal, comprising:
    a timer circuit that monitors a level of the supply voltage for providing a timer period at an output when the supply voltage reaches a first reference level; and
    a detector circuit having a first input coupled for receiving the feedback signal and a second input coupled to the output of the timer circuit for receiving the timer period, wherein the detector circuit counts occurrences of the feedback signal during the timer period and generates a fault signal as a result of the detector circuit counting a number of occurrences of the feedback signal during the timer period.

2. The switching regulator of claim 1 wherein the detector circuit includes a counter having an input coupled for counting the number of occurrences of the feedback signal to generate the fault signal.

3. The switching regulator of claim 1 wherein the timer circuit receives the supply voltage at a capacitor terminal to charge the capacitor terminal to a second reference level if the number of occurrences of the feedback signal are counted during the timer period.

4. The switching regulator of claim 3 wherein the supply voltage on the capacitor terminal discharges at a rate to the first reference level which ends the timer period.

5. The switching regulator of claim 1 further including a gate driver having a first input coupled for receiving the drive signal, a second input coupled for receiving the fault signal, and an output for enabling and disabling the drive signal in response to the fault signal.

6. The switching regulator of claim 1, wherein the timer circuit includes:
    a charging circuit coupled to a capacitor terminal for supplying a charging current if the number of occurrences of the feedback signal are counted during the timer period; and
    a first comparator having a first input coupled to the capacitor terminal, a second input coupled for receiving a first reference voltage, and an output coupled to a first output of the timer circuit.

7. The switching regulator of claim 6, wherein the charging circuit includes:
    a first transistor having a first conduction terminal coupled to a first voltage, and a second conduction terminal coupled to the capacitor terminal; and
    a resistor coupled between the first conduction terminal of the first transistor and a control terminal of the first transistor.

8. The switching regulator of claim 7, wherein the detector circuit includes:
    a first latch having a first input coupled to the first output of the timer circuit; and
    a first logic gate having a first input coupled for receiving the feedback signal, a second input coupled to a second output of the timer circuit, a third input coupled to a first output of the first latch, and an output coupled to a second input of the first latch.

9. The switching regulator of claim 8, wherein the timer circuit further includes:
    a second comparator having a first input coupled to the capacitor terminal, and a second input coupled for receiving a second reference voltage;
    a second logic gate having a first input coupled to the second output of the first latch, and a second input coupled to an output of the second comparator; and
    a second latch having a first input coupled to the first output of the timer circuit, a second input coupled to an output of the second logic gate, and an output coupled to the control terminal of the first transistor.

10. A switching regulator for generating a drive signal in response to a feedback signal, comprising:
    a timer circuit that monitors a level of the supply voltage for providing a timer period at an output when the supply voltage reaches a reference level;
    a detector circuit having a first input coupled for receiving the feedback signal and a second input coupled to the output of the timer circuit for receiving the timer period, wherein the detector circuit counts occurrences of the feedback signal during the timer period and generates a fault signal as a result of the detector circuit counting a number of occurrences of the feedback signal during the timer period;
    a gate driver having a first input coupled for receiving the drive signal, a second input coupled for receiving the fault signal, and an output for enabling and disabling the drive signal in response to the fault signal;
    a first latch having a first input coupled to a first output of the timer circuit; and
    a first logic gate having a first input coupled for receiving the feedback signal, a second input coupled to a second output of the timer circuit, a third input coupled to a first output of the first latch, and an output coupled to a second input of the first latch.

11. The switching regulator of claim 10, wherein the detector circuit further includes:
    a second logic gate having a first input coupled to the second output of the timer circuit, and a second input coupled to a second output of the first latch; and
    a second latch having a first input coupled to the first output of the timer circuit, a second input coupled to an output of the second logic gate, and an output providing the fault signal to the second input of the gate driver.

12. A circuit, comprising:

a timer circuit that develops a supply voltage across a capacitance to provide power to the circuit, and having an output for establishing a timer period when the capacitance discharges to a first voltage level of the supply voltage; and a switching regulator generating a drive signal in response to a feedback signal, wherein the switching regulator includes a detector circuit coupled for receiving the feedback signal to reset the detector circuit if a number of occurrences of the feedback signal is counted during the timer period, and wherein the detector circuit generates a fault signal to disable the drive signal as a result of counting less than the number of occurrences of the feedback signal during the timer period.

13. The circuit of claim 12 wherein the detector circuit includes a counter having an input coupled for counting the number of occurrences of the feedback signal and an output for providing the fault signal.

14. The circuit of claim 12, wherein the capacitance of the timer circuit is coupled to a capacitor terminal to charge the capacitor terminal to a second voltage level of the supply voltage if the number of occurrences of the feedback signal counted during the timer period reaches a predetermined value.

15. The circuit of claim 14 wherein the supply voltage across the capacitance discharges at a rate to the first voltage level which ends the timer period.

16. The circuit of claim 12 further including a gate driver having a first input coupled for receiving the drive signal, a second input coupled for receiving the fault signal, and an output for enabling and disabling the drive signal in response to the fault signal.

17. The circuit of claim 16, wherein the detector circuit includes:

a first latch having first and second inputs;

a first logic gate having a first input coupled for receiving the feedback signal, a second input coupled to a first output of the first latch, and an output coupled to the second input of the first latch;

a second logic gate having a first input coupled to a second output of the first latch; and a second latch having a first input coupled to an output of the second logic gate, and an output providing the fault signal to the second input of the gate driver.

18. The circuit of claim 12, wherein the timer circuit includes:

a charging circuit coupled to a capacitor terminal for supplying a charging current to the capacitance if the number of occurrences of the feedback signal counted during the timer period reaches a predetermined value; and a first comparator having a first input coupled to the capacitor terminal, a second input coupled for receiving a first reference voltage, and an output.

19. The circuit of claim 18, wherein the charging circuit includes:

a first transistor having a first conduction terminal coupled to a first voltage, and a second conduction terminal coupled to the capacitor terminal; and a resistor coupled between the first conduction terminal of the first transistor and a control terminal of the first transistor.

20. The circuit of claim 19, wherein the detector circuit further includes:

a first latch having first and second inputs; and a first logic gate having a first input coupled for receiving the feedback signal, a second input coupled to a first output of the first latch, and an output coupled to the second input of the first latch.

21. The circuit of claim 20, wherein the timer circuit further includes:

a second comparator having a first input coupled to the capacitor terminal, and a second input coupled for receiving a second reference voltage;

a second logic gate having a first input coupled to a second output of the first latch, and a second input coupled to an output of the second comparator; and a second latch having a first input coupled to the first output of the timer circuit, a second input coupled to an output of the second logic gate, and an output coupled to the control terminal of the first transistor.

22. A method of detecting a fault condition in a switching regulator which operates in response to a feedback signal to provide a drive signal, comprising the steps of:

applying a supply voltage to a node to provide operating power to the switching regulator;

comparing the supply voltage with a reference voltage to establish a timer period when the supply voltage is equal to the reference voltage;

counting a number of occurrences of the feedback signal; and detecting the fault condition as a result of counting less than a predetermined value of the number of occurrences of the feedback signal during the timer period.

23. The method of claim 22 further including the step of blocking the drive signal after detecting the fault condition.

24. The method of claim 23 further including the steps of:

counting a count value to a detection threshold to detect the fault condition; and resetting the count value if the number of occurrences of the feedback signal reaches the predetermined value during the timer period.

25. The method of claim 23 further including the steps of:

charging a capacitor terminal to increase the supply voltage to a first voltage level if the number of occurrences of the feedback signal reaches the predetermined value during the timer period; and discharging the capacitor terminal at a rate to decrease the supply voltage to a second voltage level to end the timer period.

26. The method of claim 25 further including the steps of:

setting a first latch to start the timer period;

resetting the first latch if the number of occurrences of the feedback signal reaches the predetermined value during the timer period; and charging the capacitor terminal to increase the supply voltage to the first voltage level after the timer period if the first latch is reset.

27. A method of detecting a fault condition in a switching regulator, comprising the steps of:

generating a drive signal in response to a feedback signal which is representative of an output voltage;

charging a power supply terminal of the switching regulator to a first voltage level to start a timer period;

discharging the power supply terminal to establish a duration of the timer period;

resetting the timer period after counting a number of occurrences of the feedback signal; and detecting the fault condition if the number of occurrences of the feedback signal counted before the timer period is reset is less than a predetermined value.

28. The method of claim 27 further including the step of blocking the drive signal after detecting the fault condition.

29. The method of claim 27, wherein the step of charging includes the steps of:

providing a charging current to a capacitor terminal if the feedback signal indicates the output voltage is above a regulation threshold; and detecting when a voltage on the capacitor terminal falls below a detection threshold indicating the fault condition.

30. The method of claim 27 further including the steps of:

counting a count value to a detection threshold to detect the fault condition; and resetting the count value if the number of occurrences of the feedback signal reaches the predetermined value during the timer period.

31. A method of operating a regulator circuit, comprising the steps of:

generating a drive signal in response to a feedback signal;

discharging a power supply terminal of the regulator circuit from a first level to a second level to establish a period of time; and disabling the drive signal as a result of counting less than a predetermined number of feedback signals in the period of time.

32. The method of claim 31 further including the steps of:

counting a count value to disable the drive signal upon reaching a detection value; and resetting the count value if the predetermined number of feedback signals are counted in the period of time.

33. The method of claim 31 further including the steps of:

charging a capacitor terminal to a first voltage if the predetermined number of feedback signals are counted in the period of time; and discharging the capacitor terminal at a rate to a second voltage to end the period of time.

34. A voltage regulator having a node for operating from a supply voltage and an output for generating a regulated voltage, comprising a fault detection circuit having a first input for detecting a feedback signal developed from the regulated voltage, a second input coupled to the node and an output for generating a fault signal when the supply voltage reaches a reference level before the feedback signal is detected.

35. The voltage regulator of claim 34, further comprising a drive circuit having an output for switching an inductor current that develops the regulated voltage and an input for receiving the fault signal to block the inductor current.

36. The voltage regulator of claim 34, wherein the fault detection circuit includes a comparator for generating the fault signal when a capacitance of the node discharges the supply voltage from a first level to a reference level.

* * * * *